Aug. 25, 1959  L. M. KNIGHT ET AL  2,901,265
STEERING MECHANISM FOR CAMERA DOLLY
Filed March 17, 1958  3 Sheets-Sheet 1

INVENTORS,
LEONARD M. KNIGHT
RALPH CHAPMAN;
BY
J. Calvin Brown
ATTORNEY

Aug. 25, 1959 L. M. KNIGHT ET AL 2,901,265
STEERING MECHANISM FOR CAMERA DOLLY
Filed March 17, 1958 3 Sheets-Sheet 2

INVENTORS,
LEONARD M. KNIGHT
BY RALPH CHAPMAN;

ATTORNEY

INVENTORS,
LEONARD M. KNIGHT
RALPH CHAPMAN
BY
ATTORNEY

United States Patent Office 2,901,265
Patented Aug. 25, 1959

2,901,265

STEERING MECHANISM FOR CAMERA DOLLY

Leonard M. Knight and Ralph Chapman,
Sherman Oaks, Calif.

Application March 17, 1958, Serial No. 721,923

9 Claims. (Cl. 280—91)

The present invention relates broadly to steering mechanism, and specifically to steering mechanism adapted to be incorporated in a dolly of the type which may incorporate a crane and a boom for use in the supporting of a camera of any type, such as motion picture and television, as well as the operator of the camera, and, in certain instances, a director as well.

The invention, however, is directed specifically to the steering mechanism for the dolly. As is generally known, motion picture and television studios provide dollies for the cameramen and the camera, and which dollies are moved over a surface during the taking of a scene or the photographing thereof, and which dollies are usually moved under the direction of a cameraman or director either linearly or in a curved path. It is a prime essential that the dolly move very easily and without vibration or jar during movement. Otherwise, the filming would be affected with resulting distraction to the cameraman and to the director.

Dirigible type dollies for supporting cameras and the operator usually involve complicated mechanism and mechanism that requires frequent repair. Such mechanism as the inventors are aware of, incorporates long, continuous chains passed around sprockets associated with the wheels for controlling a turning movement of the wheels. It is obvious that the chains may break or stretch or other difficulty may be encountered, with the result that the dolly does not steer properly.

The present invention has for an object the provision of a dirigible type camera dolly wherein the turning movement of the wheels is under direct control of the operator and wherein it is assured that the wheels are always properly moved either to effect a linear path of movement or a turning movement.

A further object is the provision of a dirigible type dolly for cameras, of simplified construction and which eliminates chains for turning the individual wheels of the dolly.

A further object is the provision of a wheeled dolly for cameras which incorporates a single control for effecting turning movement or lineal movement of the wheels.

A further object is the provision of a steering mechanism for dollys which through means of a single control permits all of the wheels to be simultaneously rotated or to hold two wheels in parallel relationship while two of the wheels are turned, or wherein the dolly may be moved sideways, the wheels being turned so as to be parallel transversely of the dolly, with all movements of the wheel structure so related that vibration and jar to the dolly does not result.

Other objects of the invention include a device of simple structure, foolproof in operation, and generally superior to structures for similar purposes now known to the inventor.

With the above mentioned and other objects in view, the invention consists in the novel and useful provision, formation, construction, association, and relative arrangement of parts, members, and features, all as disclosed in a certain embodiment in the accompanying drawings, described generally, and more particularly pointed out in the claims.

Figure 2:
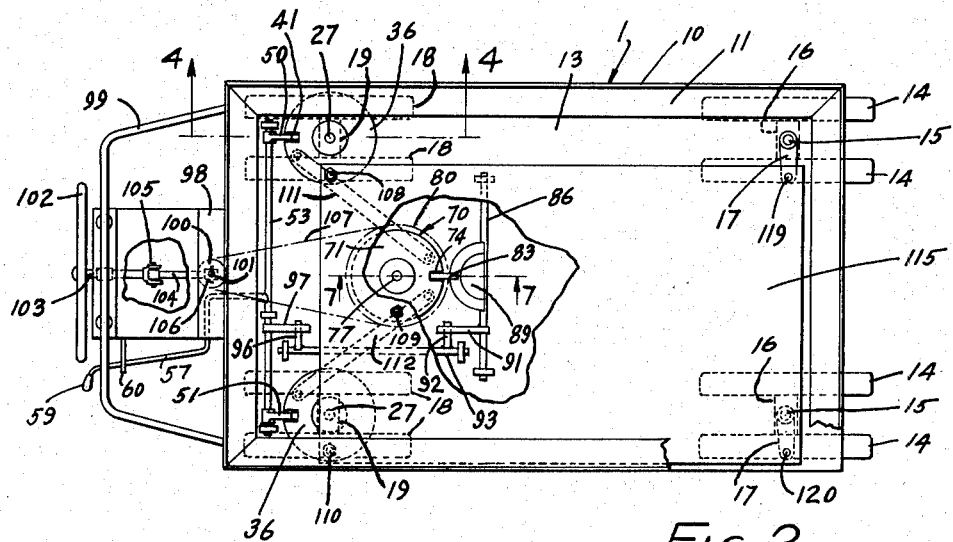
Figure 2 is a fragmentary, top plan view of the dolly.
Figure 8:
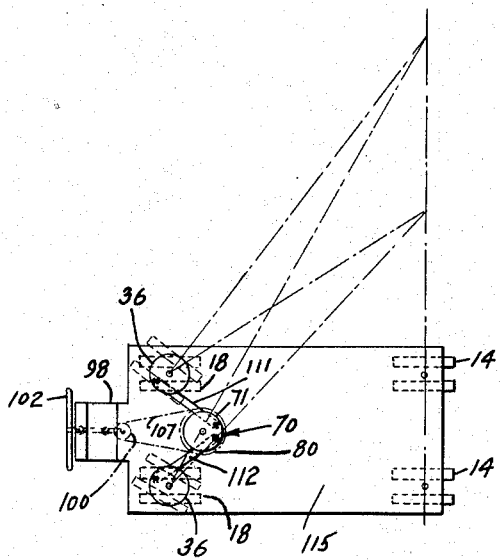
Figure 3:
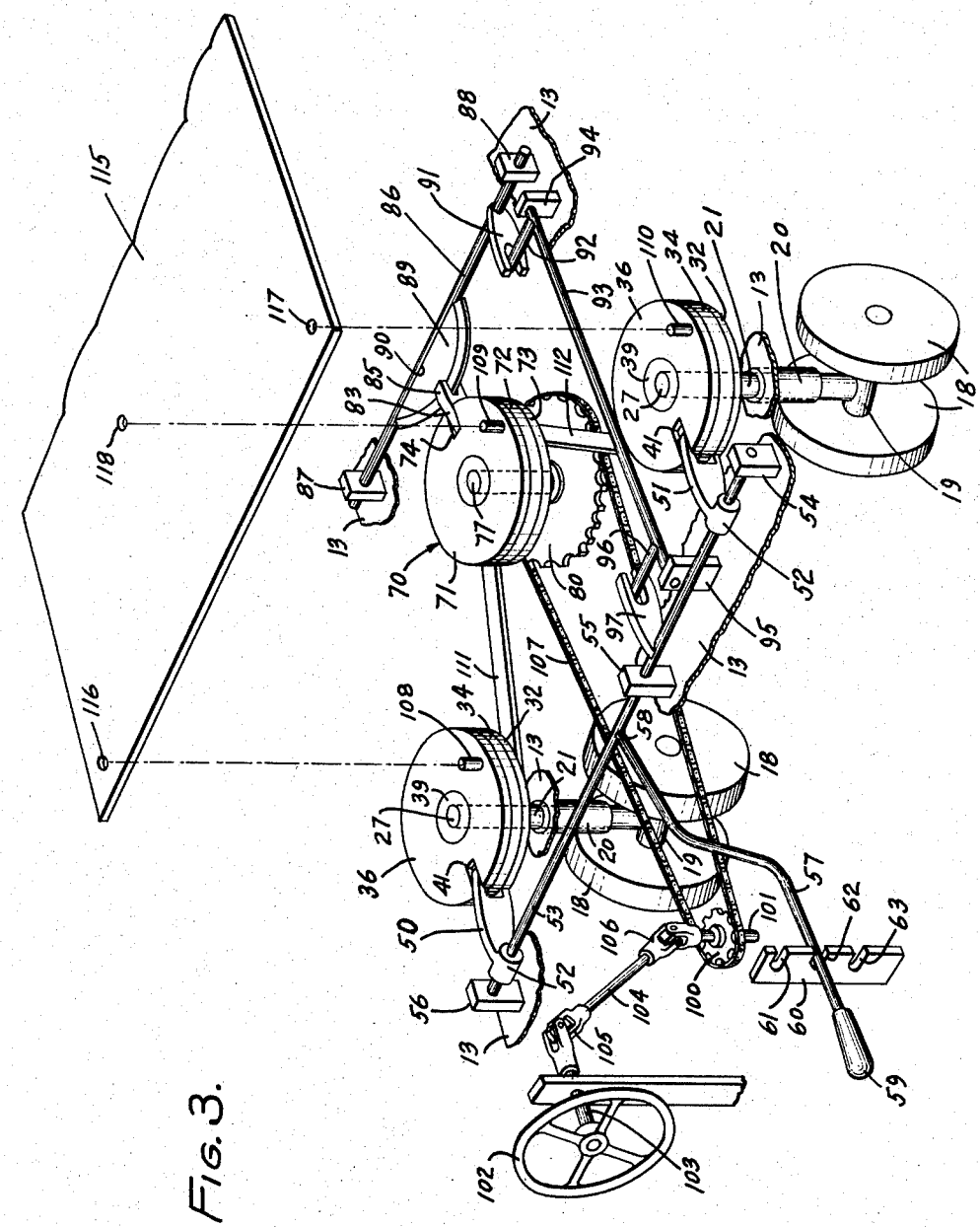
Figure 4:
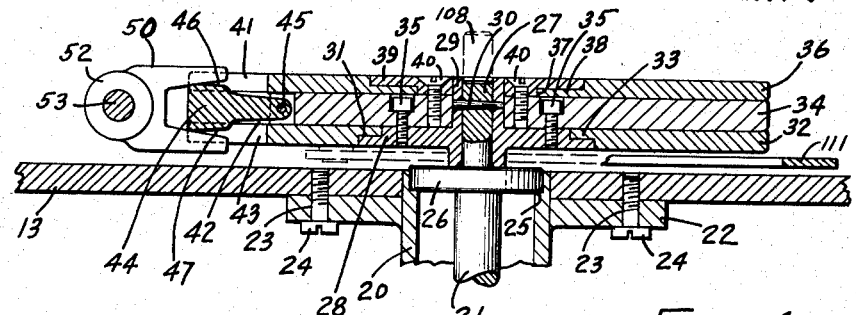
Figure 5:
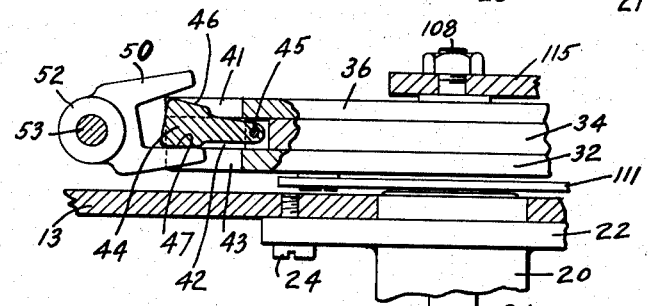
Figure 6:
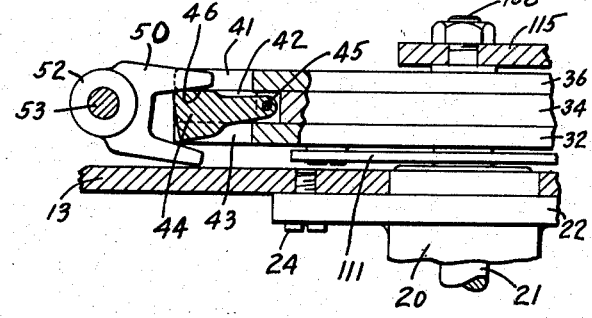
Figure 7:
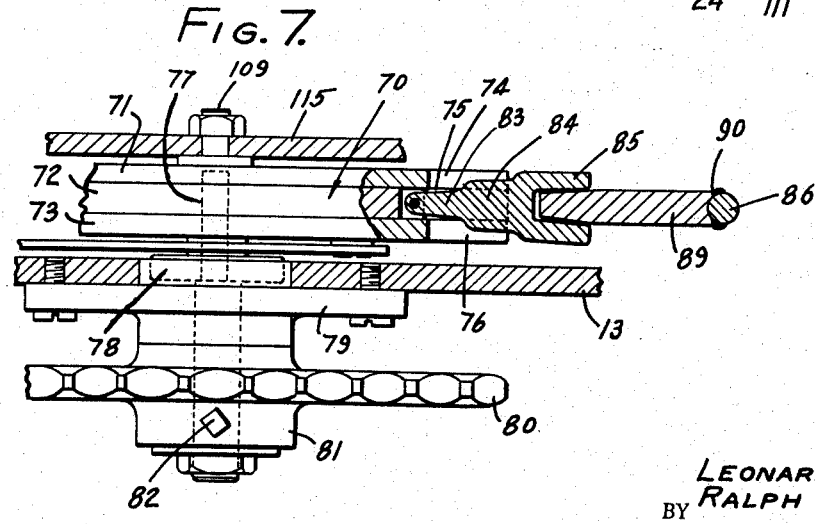

Figure 3 is a schematic, fragmentary, perspective view of operating mechanism for the rear wheels of the dolly, Figure 4 is a fragmentary sectional view, taken on the line 4—4 of Figure 2, and on an enlarged scale, Figure 5 is a fragmentary, partially sectional view of certain of the mechanism of Figure 4, and showing parts in a changed position, Figure 6 is a fragmentary sectional view similar to that of Figure 5, parts being in moved position, Figure 7 is a fragmentary sectional view on the line 7—7 of Figure 2, and on an enlarged scale, and, Figure 8 diagrammatically illustrates the intersection of lines extended from the centers of the wheels.

Figure 1:
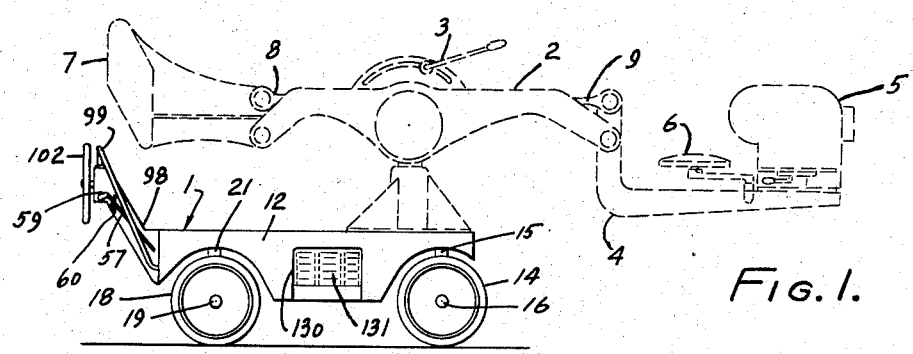
Figure 1 is a side elevation of the dolly incorporating a crane and a boom.

Referring now to the drawings, and specifically to Figure 1, the dolly includes the chassis 1 which is adapted to have mounted thereon for rocking and turning movement a crane 2 (shown in dotted lines), the rocking movement of the crane being controlled by the tilt brake means 3, and which crane pivotally carries a nose boom 4 upon which is mounted a camera 5 of any character, together with a seat 6 for the cameraman. The weight of the cameraman and camera is counterbalanced by weights 7 carried by weight boom 8, pivoted to the opposite end of crane 2, and a leveling rod 9 pivotally interconnects the weight boom 8 with the nose boom 4. As stated, this particular structure does not form any part of our invention, although it is to be understood that such a structure, or some similar structure, is utilized with the dolly. The frame structure 10 of the chassis 1 is substantially of open rectangular form, in the present instance, and is of angle construction, in that it has a top leg 11 and side leg 12, which side leg varies in depth as best shown in Figure 1. The top leg 11, both for the sides and ends of the frame, are of substantially the same width, as shown in Figure 2. Transverse framing member 13 extends between the side legs 12 and beneath the top legs 11.

For convenience of description, the framing member 13 will be termed base framing.

We prefer to support the dolly on pairs of wheels, although it is obvious that single wheels may be utilized, and the pairs of wheels are so related as to provide two pairs for the front of the dolly and two pairs for the rear thereof, as shown in full lines in Figure 1, and dotted lines in Figure 2. Each pair of front wheels 14 has a kingpin 15 mounted upon an axle 16, and which kingpin extends through the base framing 13, being journaled in suitable bearings. Each kingpin 15 is provided with an arm 17, keyed or otherwise secured thereto, whereby rotary movement of said kingpin produces turning movement of the pair of wheels. As shown in Figure 2, the arms 17 for each kingpin are in alignment and parallel.

Each pair of rear wheels are similarly mounted to the base framing 13 and, accordingly, one of said pairs of wheels will be described.

Referring to Figure 3, a rear pair of wheels, designated as 18, is provided with an interconnecting axle structure 19 and mounted normally upon the housing for said axle is a tubular housing or casing 20 for a kingpin 21. The housing or casing 20 is secured to the base frame 13, in any appropriate manner, and kingpin 21 extends through and beyond the upper surface of said base framing. This kingpin is, in reality, a shaft, and reference is made to Figure 4 for greater detail.

It will be seen, in Figure 4, that the housing or casing 20 is supported by means of an annular plate 22 which surrounds the housing or casing, and is welded or otherwise secured thereto, the plate in turn provided with a plurality of bores 23 through which screws may be passed for threaded engagement with threaded bores in the base framing 13, as shown at 24. The casing 20 is provided with an internal annular ledge 25 which supports a bearing member 26 for the kingpin 21, the kingpin being reduced in diameter, as shown at 27, above the bearing. Surrounding the reduced portion 27 of the kingpin is a disk 28 which is centrally, annularly flanged on each side of said disk, as shown at 29. The upper flanged portion for the disk is provided with a transverse tapered bore, as is likewise the kingpin to receive a tapered transverse pin 30, to interlock the kingpin with the disk, so that turning movement of the kingpin produces a turning movement of the said disk 28. The disk 28 is reduced annularly in transverse width or stepped, at 31. Supported by said disk 28 is a disk 32, the disk 32 being reduced annularly in transverse width at 33, so as to fit upon the reduced transverse width portion 31 of disk 28, thus providing a lap joint relationship. This construction, as stated, provides a support for disk 32. Disk 32 is termed the conventional steering disk, this term being explained later, but used at this time in order to distinguish other disk members about to be described.

It is to be noted that the top and base surfaces of the supporting disk 28 are flush with the top and base surfaces of the disk 32. Supported on top of the disks 32 and 28 is annular disk 34 which has the same diameter as disk 32. Disk 34 is secured to the support disk 28 in any convenient manner, such as by screws 35, of which there may be a number, passed through aligned openings in the two disks, the heads of the screws, which may be of the Allen type, being countersunk within the disk 34, as shown in Figure 4. Disk 34 surrounds the flange 29 of disk 28 and supported upon disk 34 is a further disk 36 having the same diameter as disks 34 and 32. Disk 36 has an enlarged internal bore at 37 and is annularly reduced in thickness at 38 to receive an annular cover plate 39, also reduced in thickness for a part thereof, to provide a lap relationship between the disk and plate. The bore of said cover plate fits about the flange 29 and flush face screws, of which there may be a number, as shown at 40, secure the cover plate to the disk 34. The disk 34 is termed the intermediate or control disk, while disk 36 is termed the four-wheeled steering disk. Each of the said disks, to-wit, 32, 34 and 36, is provided with a radial slot which extends from the periphery of each disk inwardly a short distance, as shown in Figure 4, the slot for each disk being designated as 41, 42 and 43. These slots are adapted to align. The intermediate or control disk 34 is formed to carry a dog 44 within slot 42. The dog arm is pinned at 45 to the disk 34 and the head of said dog relative to its arm is enlarged and provided with outwardly divergent sides 46 and 47. The sides 46 and 47, in the position shown in Figure 4, span or bridge all slots of said disks. The divergency of the sides of the head of the dog is such that when the dog is moved upwardly to the position shown in Figure 5, the side 47 is in alignment with the plane of the top of the disk 32 and when the dog is moved downwardly to the position of Figure 6, the side 46 is in alignment with the plane of the bottom surface of the disk 36.

As previously stated, there are two pairs of rear wheels, the kingpins of which are in alignment and spaced apart, as shown in Figure 3, and the same numerals of reference for the rear wheel assembly just described will apply to the other rear wheel structure and assembly. The slots in the several disks for both rear wheel assemblies are parallel in the position shown in Figure 3.

Adapted for reception in the three slots of each rear wheel assembly disks 32, 34 and 36 are forked or bifurcated arms 50 and 51. Each forked arm is of similar construction, and forked arm 50 will be described. The furcations of the arm 50 straddle the sides 46 and 47 of the head of dog 44. The inner edges of the furcations converge inwardly of said arm, so as to parallel one or the other surface 46 or 47 of the dog head when the arm 50 is moved from the position of Figure 4 to that of Figure 5 or 6. Each arm 50 and 51 is provided with a hub, designated generally as 52, and each hub is fixedly mounted upon an elongated shaft 53, which shaft is supported upon the base 13 by means of bearing posts positioned at 54, 55 and 56. A shift arm or lever 57 has one end thereof fixedly secured to shaft 53, at 58. The opposite end of the lever carries a handle 59 and the lever is intermediately bent. This intermediate bent portion may not be necessary in all instances, but is shown in the present instance for ease in handling the lever and avoiding other mechanism of the invention (see Figure 2). The lever is adapted to be received in slots in a selector plate 60. The upper slot 61 is known as the conventional wheel steering position, or the position at which the rear wheels may be turned, the front wheels remaining parallel and in a straight-ahead position, or the position illustrated for the front wheel assembly in Figure 2; and slot 62 or the intermediate slot as the straight position, which means a position in which all of the wheels are parallel for linear movement, while the slot 63 is the four-wheel steering position. It is evident that a shifting of the arm or lever 57 between the different slots turns the shaft 53 to in turn rock the arms 50 and 51 to the positions shown in Figures 4, 5 and 6.

The steering assembly includes the assembly shown in Figure 3, at 70, and in enlarged detail in Figure 7. This assembly has three disks 71, 72 and 73 having the same diameters as the disk assemblies 32, 34 and 36, but differing therefrom in the means of inter-associating the said disks. In the instance of the disks 71, 72 and 73, each disk is provided with a slot as 74, 75 and 76, and the said disks are axially mounted upon a shaft 77. This shaft is similar to the shaft 21 in that it has two portions of different diameter, the smaller diameter portion mounting the disks. The shaft 77 is provided with a bearing at 78, and the bearing is supported by an annular plate 79 secured beneath the base frame 13. Mounted upon the enlarged diameter portion of shaft 77 is a sprocket 80, the hub 81 of said sprocket being keyed to the shaft 77 by any suitable means, such as illustrated at 82. The intermediate disk 72 rockably mounts a dog 83 within the slot 75. This dog has an intermediate portion 84 and a bifurcated portion 85. The intermediate portion 84 of the dog has outwardly divergent side edges, the same as for the dog 44. It will be observed that the disk assembly for the wheels and for the assembly at 70 is so arranged that the shaft 77, with respect to the kingpins 21, are at the apices of an isosceles triangle.

A shaft 86, parallel to shaft 53, is mounted in bearing blocks 87 and 88 positioned on the top surface of the base frame 13, with an intermediate segmental arm 89 secured to said shaft 86 along its chord 90, the bifurcated portion 85 of the dog 83 receiving between the furcations thereof, the arcuate portion of the arm 89. Shaft 86 is provided with a bifurcated arm 91, the furcations of which embrace an arm 92 secured to and normal to the axis of an elongated shaft 93. Shaft 93 is journaled in posts 94 and 95, carried by base frame 13, and an arm 96 normal to shaft 93, is embraced by the furcations of a bifurcated arm 97 secured to shaft 53.

As shown in Figures 1 and 2, the frame structure is extended centrally at the rear thereof, as shown at 98, the same being braced by bar 99, the portion 98 acting as a support for the steering wheel and its shaft, and likewise as a support for a drive sprocket. Thus, referring to Figure 3, a small drive sprocket 100 suitably mounted upon a shaft 101, within bearings of the frame extension 98, is adapted to have its shaft rotated by a hand wheel 102 positioned as shown in Figure 2. The shaft 103 for said hand wheel cooperates with jackshaft 104, there being universal joints 105 and 106 interconnecting the several shafts. A continuous chain 107 is passed between the drive sprocket 100 and sprocket 80.

The uppermost disks 36 and 71 of the disk assemblies are each provided with upstanding pins 108, 109 and 110, and the pin positions form an isosceles triangle, in that the distances between pins 108 and 109 and 109 and 110 are equal, and, accordingly, located at the same position for all of the said disk assemblies. The lowermost disk of each disk assembly, to wit, the disks 32 and 73, are connected by pitman or link arms 111 and 112. These pitman arms are of equal length and pinned at their ends to said disks. As shown in Figure 2, one end of each pitman arm is pinned adjacent the rim of the disk 73 at opposite sides of dog 83, while the opposite end of each pitman arm is pinned to a lowermost disk 32 at one side of the slot in each disk. In the position for the wheels shown in Figure 2, it will be observed that the pitman arms substantially form the legs of an isosceles triangle.

A rectangular plate 115 of smaller dimension than the inner dimension of the flange inclosure 11 of the frame is formed to overlie the disk assembly 70 for engagement with the pin 109 thereof, and likewise the plate overlies the disk assembly for the rear wheels and to this end, the said plate 115 is provided with bores 116 and 117 adjacent corners of said plate and a bore 118, for reception of the pins 108, 109 and 110. At the opposite corners of the plate 115, the plate is bored to receive pins 119 and 120 carried on ends of the arms 17 for the front wheel assemblies. Thus, in Figure 2, in the position for the wheels as shown, the spacing between the front wheel pins 119 and 120 is the same as the spacing between pins 108 and 110. Likewise, the spacing between the pins 108 and 119 is the same as the spacing between pins 110 and 120. A diagonal which would extend between pins 110 and 119 is the same length as a diagonal between pins 108 and 120. Plate 115 is spaced slightly beneath the frame flange 11, and the size of the fixed plate 115 is such as to permit its free movement within the frame structure 10 if the disk assemblies associated with the rear wheel structures as well as the arms 17 associated with the front wheel structures are completely rotated.

The operation, uses and advantages of the invention just described are as follows:

Assuming that an operator is standing back of the wheel 102 and it is desired to move the dolly straight forwardly, the arm 57 will be placed within slot 62 and in this position, the dogs 44 will lie intermediate the slots of the three disk assemblies for the rear wheels, as shown in Figure 4, and the arm 17 for the front wheel assemblies will be in the position shown in Figure 2, with the result that the front and rear wheels are in alignment and parallel, as shown. If it is desired to maintain the front wheels straight, as shown in Figure 2, and to turn the rear wheels, the arm 57 is shifted to the slot 61, which is termed the "conventional" steering position. In this instance, when the arm 57 is moved into the slot 61, the shaft 53 is revolved and the arms 50 and 51 are simultaneously moved to the position shown in Figure 6. In this position, the heads of the dogs 44 for each rear wheel disk assembly straddles the slots 42 and 43 in disks 32 and 34. The dog 83 has been similarly moved by the arm 89 by movement of the shafts 86 and 93. As the conventional steering disks 32 for the rear wheel assemblies and a like disk 73 of assembly 70 are connected by the pitman arms 111 and 112, rotation of wheel 102 will turn the sprocket 100 to move the continuous chain 107 and rotate sprocket 80 without, however, causing any movement of the uppermost disks 36 and 71 of the assemblies, with the result that there is no movement of the fixed plate 115 and, hence, the front wheels remain in the position shown in Figure 2, the rear wheels being turned simultaneously on an equal arc by the pitman arms 111 and 112 to provide what we term as "conventional" steering.

If it is desired to operate all four pairs of wheels simultaneously, the lever 57 is shifted to the slot 63 which revolves the shaft 53 counter-clockwise to raise the bifurcated arms 50 and 51 and likewise raise the arm 89.

When the lever 57 is within the slot 63, the bifurcated arms 50 and 51 tip to the position shown in Figure 5, and the arm 89 moves the dog 83 upwardly with the result that a turning movement of sprocket 80 rotates disks 71 and 72, it being remembered that disk 72 is secured to shaft 77, the other two disks 71 and 73 being free on said shaft. Thus, disks 34 and 36 of the rear wheel assemblies and disks 71 and 72 of the assembly 70 are rotated, with the consequence that the fixed plate 115 is moved in a curved path, which moves the front wheel assemblies due to the pin connections of said plate with the arms 17. The wheel 102 may be revolved to cause a complete turning action or revolution of the front and rear wheel assemblies. Thus, the wheels may be turned at right angles to the showing of Figure 2, for side movement of the dolly, or at any angle desired easily and quickly, as well as smoothly and without jar or vibration.

It may be mentioned that the base frame is in two parts and in separated relationship, the separation occurring at the zone marked 130 which constitutes portions on each side of the framing for supporting weights 131, which may be removed or replaced in accordance with the weight necessary for the end 7 of the crane and boom structure.

The provision of the fixed plate 115, due to its rigidity and its pinned connection with the top disks 36 and 71 of the three assemblies, and its connection with the arms 17 for the front wheel assemblies, assures at all times a positive turning action of the front and the rear wheels through equal angularities. There is nothing to stretch, as in the case of a chain, and breakage of the pins, for the top disks and arms 17 is not likely. It is evident that when the bifurcated arms 50 and 51 are moved relative to the upper and lower disks, that one or the other of the furcations of said arms will be above or below a disk, as shown in Figures 5 and 6. Thus, one furcation will hold one disk against any rotation, while the other two disks are capable of being rotated. Hence, it is evident that when the arms 50 and 51 are in the position shown in Figures 3 and 4, that all of the disks are locked against any rotary movement as the bifurcated arms, in each instance, engage the upper and lower disks, and the head of the dog likewise lies between said upper and lower disks. Locking movement is, therefore, positive, depending on whether straight line movement or conventional movement, as well as complete rotation, is desired.

It is essential in dolly construction of the character described that true rolling action be had between the pairs of wheels. Otherwise, when one wheel is turned, the other wheel would slip or slide. True rolling action is obtained in the present invention by varying the radius of connection between the pitman or link arms 111 and 112 with the three disk assemblies, and specifically disks 32 and 73. We have found, by way of example only, that the pitman arms 111 and 112 may be pivoted at one end to the disk 73 at approximately 3.68 inches from its axis of rotation, while the opposite end of each pitman arm is pivoted to its respective disk 32 at approximately 3.75 inches from its axis of rotation. The two pins for the pitman arms for disk 73 may be at substantially 74½ degrees apart, while the pins connecting the opposite ends of said pitman arms with the disk 32 subtend an angle of approximately 40 degrees relative to a line interconnecting the two kingpins 27, assuming, of course, that the wheels 18 for each side of the dolly are parallel or in the position shown in Figure 3. As is well known, in the case of automobile steering mechanism, to obtain proper steering geometry, certain factors must be known, such as the wheel base, the tread, space limitations, minimum turning radius, the position of the pitman arm, etc. This may follow well known formulae and the inventors make no effort at this point to give the formulae for this reason. In any event, the present device is readily adjustable for true rolling action between the wheels.

It is apparent that we have provided a dolly which accomplishes the objects stated for the invention and wherein, with the exception of the chain 107, we have done away with all other chains for the turning of the wheels of the dolly. Further, we have provided a structure which is capable of smooth operation, and with few parts to get out of order or malfunction.

We claim:

1. A camera dolly, including a frame, front and rear wheels, a kingpin for each wheel carried by the frame for turning the respective axes of each wheel, a steering transmission for each rear wheel comprising an assembly of three coaxial disks arranged in juxtaposition on a kingpin to provide an intermediate disk and two outer disks, the intermediate disk of each steering transmission being secured to the kingpin for the respective wheel, means for interlocking all of said disks against rotation and shiftable to lie between either outer disk and the intermediate disk, the other outer disk being held against rotation on the kingpin, and a third steering transmission having an intermediate and two outer disks, a shaft coaxially mounting said disks, the intermediate of said aforesaid disks being fixedly secured to said shaft, and means for said third named steering transmission shiftable between the disks thereof to like positions of the first named means with the rear wheel transmissions when the first named means is moved, means for rotating the shaft of the third named steering transmission, links extending between an outer disk of said third steering transmission and a like positioned outer disk of each steering transmission for each year wheel for movement by the shaft of the third named steering transmission, the first named means in each instance interlocking the intermediate disks and the other outer disks of each transmission causing turning movement of the rear wheels through said links.

2. A camera dolly including a frame, front and rear pairs of wheels for supporting the frame, a kingpin between each wheel and the frame for turning the respective axes of each wheel; a steering transmission for each rear wheel comprising three coaxial disks arranged in juxtaposition on a kingpin to provide an intermediate disk and two outer disks, the intermediate disk being secured to the kingpin for the respective wheel, a dog carried by the intermediate disk of each steering transmission for holding in one position all of said disks against relative rotation, shiftable means for positioning the dog between either outer disk and the intermediate disk, the non-dog engaged outer disk being held by said shiftable means against rotation, a third steering transmission having an intermediate and two outer disks, a shaft coaxially carrying said disks, the intermediate disk of said third steering transmission being secured to said shaft, a dog carried by the intermediate disk of said third steering transmission, and shiftable means for moving the dog to position the same between either outer disk and the intermediate disk, the said shiftable means holding the other outer disk against rotation, and means for causing simultaneous and like movement of the shiftable means for each steering transmission to position each shiftable means and a dog in the same relative position relative to the disks of each steering transmission.

3. The device as set forth in claim 2, characterized in that one outermost disk of each steering transmission is provided with an upstanding pin, the pins of which occupy the same angular position on each disk, and means interconnecting said three pins.

4. The device of claim 3; the front two kingpins being provided with arms normal to the axis thereof, and means of connection between the ends of said arms and the means interconnecting the pins for the outermost disk of the three steering transmissions to produce the same direction of turning movement of the said arms as that of the said outermost disks when rotated.

5. The device of claim 3, characterized in that: the said means interconnecting said three pins comprises a rigid plate having bearing portions for receiving the pins.

6. The device of claim 2, characterized in the provision of: means interconnecting an outermost disk of each steering transmission to produce differential rotation of the rear wheels.

7. The device of claim 2, characterized in that: each front wheel kingpin is provided with an arm, and means interconnecting one outermost disk of each steering transmission with an arm of a front wheel kingpin.

8. The device of claim 7; the shiftable means for each transmission when simultaneously moved to position the same between the intermediate and an outermost disk of each transmission permitting complete rotation of the front and rear wheels on their axes.

9. The device as set forth in claim 2, characterized in that: each front wheel kingpin is provided with an arm and each arm is provided with a pin normal to the arm, and one outermost disk of each steering transmission is provided with a pin normal to the said disk, and a fixed plate having bearing portions for engagement with the said pins.

References Cited in the file of this patent

UNITED STATES PATENTS

| | | |
|---|---|---|
| 2,228,247 | Cunningham | Jan. 14, 1941 |
| 2,470,496 | Krilanovich | May 17, 1949 |
| 2,719,043 | Oppenheimer | Sept. 27, 1955 |